Figure 1:
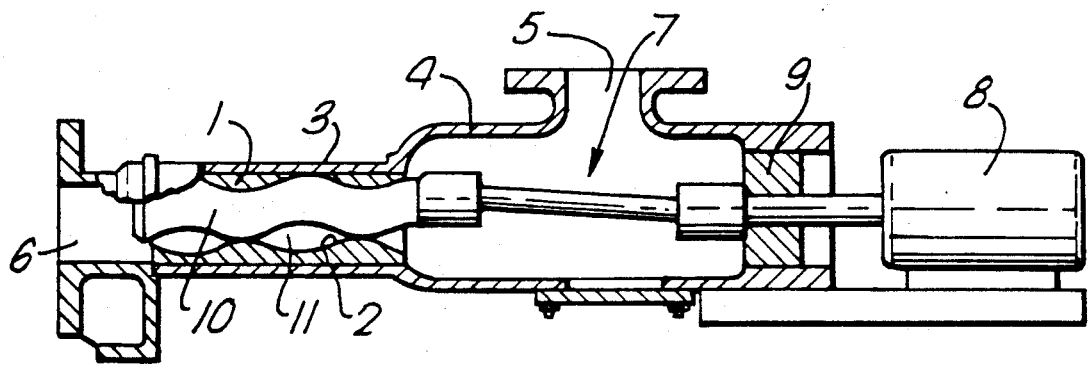

United States Patent [19]
Naylor et al.

[11] Patent Number: 5,085,564
[45] Date of Patent: Feb. 4, 1992

[54] FLEXIBLE DRIVE SHAFT

[75] Inventors: Roger L. Naylor, Lancashire; David K. Morris, Warrington, both of England

[73] Assignee: Mono Pumps Limited, Audenshaw, United Kingdom

[21] Appl. No.: 523,434

[22] Filed: May 15, 1990

[30] Foreign Application Priority Data

May 17, 1989 [GB] United Kingdom ............ 8911304

[51] Int. Cl.⁵ ............................................. F04C 2/00
[52] U.S. Cl. ................................... 418/48; 464/181; 464/97; 418/182
[58] Field of Search .............. 418/48, 182; 464/97, 464/181, 182, 183

[56] References Cited

U.S. PATENT DOCUMENTS

| | | | |
|---|---|---|---|
| 3,292,389 | 12/1966 | Adloff et al. | 464/97 |
| 3,600,113 | 8/1971 | Brentwood et al. | 418/48 |
| 4,153,397 | 5/1979 | Allen | 418/48 |
| 4,237,704 | 12/1980 | Varadan | 418/182 X |
| 4,443,165 | 4/1984 | Chanton | 418/48 |
| 4,591,322 | 5/1986 | Ono et al. | 418/48 |
| 4,637,785 | 1/1987 | Bäckström | 418/48 |
| 4,679,638 | 7/1987 | Eppink | 418/48 |

FOREIGN PATENT DOCUMENTS

| | | | |
|---|---|---|---|
| 3421191 | 12/1985 | Fed. Rep. of Germany | 464/181 |
| 2124735 | 2/1984 | United Kingdom | 464/181 |

Primary Examiner—Allan D. Herrmann
Assistant Examiner—Julie Krolikowski
Attorney, Agent, or Firm—Fleit, Jacobson, Cohn, Price, Holman & Stern

[57] ABSTRACT

A flexible drive shaft for a helical gear pump having a rotor 10 in which the drive shaft 18 is formed with an enlarged, e.g. upset forged, head 20 and is provided with a plastics material coating 30. The drive shaft is held on to the rotor by bolts 40 passing through holes 28 in the head 20 and apertures 42 in a cap 32.

9 Claims, 1 Drawing Sheet

FLEXIBLE DRIVE SHAFT

The present invention relates to a flexible drive shaft for a helical gear pump and a pump including such a drive shaft.

Helical gear pumps comprise a stator having female helical bore therein with n starts, and a rotor rotatable in said bore with n±1 starts. The rotor is normally driven by a drive shaft which can either be a shaft having a universal joint at each end or by means of a flexible drive shaft. Such flexible drive shafts are elongate, and of a relatively small diameter and are provided with a coating of plastics material to prevent problems of corrosion fatigue.

Several methods have been employed for connecting the flexible drive shaft to the rotor. A most commonly used version is for the helical drive shaft to be provided with a slightly enlarged head, having a morse taper, this being engaged in an adaptor having a cooperating tapered bore. The end of the drive shaft is retained in the adaptor by an axially extending bolt and the adaptor is secured to the end of the rotor by a number of cap screws passing through a flange on the adaptor. The cover plate is arranged to cover the cap screws with the interposition of a gasket, the cover plate itself being retained by further screws.

Such a structure is relatively complex, expensive and time consuming to mount.

It is now proposed, according to the present invention, to provide a flexible drive shaft for a helical gear pump, said drive shaft comprising an elongate metal shaft; an enlarged integral head formed on one end of the shaft, said enlarged head being provided with at least one hole passing axially therethrough adapted to cooperate with fixing means to hold said enlarged head in abutting, driving engagement with the rotor of the helical gear pump; connecting means to connect the other end of the drive shaft to a drive motor and a plastics material coating extending along substantially the full length of the shaft between said holding means and said connecting means.

Such a structure is relatively simple and inexpensive to manufacture and easy to mount.

The enlarged head can be produced by machining stock down to the reduced diameter, by a casting or by any other means. However, preferably, it is produced by forging e.g. upset forging stock which has the diameter of the remainder of the shaft. The forged head can easily be machined to its final format and the connecting means in a preferred structure comprise a plurality of holes passing axially through the head and bolts which can be passed through said holes to be screwed into the rotor. These bolts are normally arranged around a pitched circle and any suitable number, for example five or more can be used.

The connecting means may further comprise a cap having a plurality of apertures in register with the holes through which these bolts may pass.

Figure 2:
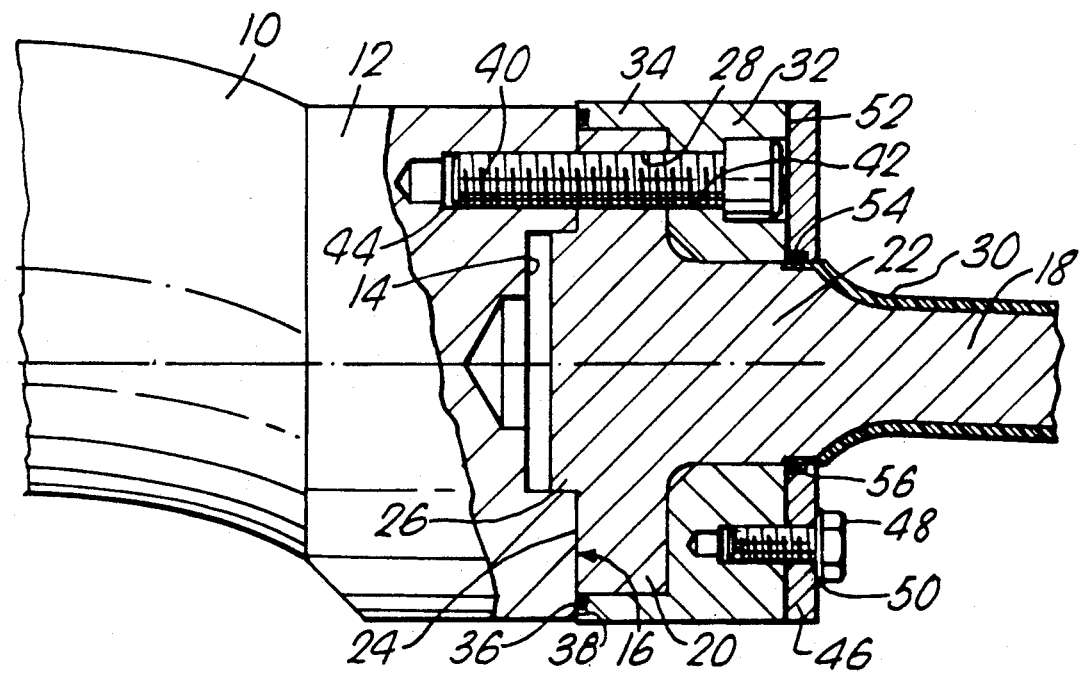

In order that the present invention may more readily be understood, the following description is given, merely by way of example, reference being made to the accompanying which:

FIG. 1 is a schematic showing of one embodiment of helical gear pump according to the invention; and FIG. 2 is an enlarged view showing the connection of the flexible drive shaft to the rotor.

Referring first to FIG. 1, a stator 1 is provided with a female helical gear formation 2 and is mounted in a barrel 3 connected to a pump housing 4 having an inlet 5. At the left-hand end of the stator is shown the pump outlet 6. A drive shaft is indicated by the general reference numeral 7 and is driven by an electric motor the output shaft which passes through a seal assembly 9. The drive shaft assembly 7 is connected to a rotor 10 having a male helical gear formation. The female helical gear formation has n starts, usually 2 starts, and the male helical gear formation has n±1 starts, usually 1 start. When driven by the motor 8, via the flexible drive shaft assembly 7, the rotor is caused by to rotate and to orbit. This is a standard helical gear form of pump.

If reference is now made to FIG. 2, the rotor 10 has an extension portion 12 having a recess 14 formed therein and a flat annular end face 16. An elongate flexible drive shaft 18 is shown with an upset forged head 20 with an intermediate thickened portion 22. The head 20 is machined to have a flat face 24 and a central circular projection 26 of the same external diameter as the recess 14, so that the head and rotor are accurately located.

A number, usually five or more, of holes 28 are machined axially through the head 20 on a pitch circle.

It will be noted that the drive shaft 18 has a shrunk wrapped plastics material coating 30 which extends over the thickened portion 22 for a certain length.

Associated with the upset forged head 20 is an annular cap 32 having a skirt 34 which surrounds the periphery of the head 20 and is provided with an O ring seal 36, located in an annular rebate 38.

Bolts 40 are passed through apertures 42 in register with the holes 28 and are threaded into bores 44 formed in the end portion 12 of the rotor. It is contemplated that instead of having the recess 14 and projection 26, location between the flexishaft and the rotor heads could be achieved by using fitting bolts to secure the flexishaft to the rotor.

In order to seal the bolts 40 from the fluid being pumped, a cover plate 46 is secured on the remote face of the cap 32 from the rotor by retaining screws 48 having tab washers 50 and a gasket 52 is positioned between the cap 32 and the cover plate 46. To effect a complete seal an O ring 54 is mounted in a further annular rebate 56 formed in the cover plate. The O ring in fact bears against the end portion of the shrink wrap coating 30 which extends over the thickened part 22 of the flexible shaft 18, the shrink wrap which extends over the thickened portion 22 of the shaft acting as a landing for the O-ring. The components which are subject to the fluid being pumped, that is the cover plate and the cap 32 will be formed of a corrosion-resistant material such as stainless steel.

At the far end of the drive shaft there is provided a connecting means which can be of any suitable form, such as the conventional taper arrangement. This will be particularly necessary if the cap 32 and the cover plate 46 are of annular form. It is conceivable that they need not be made of annular form but of part annular form in which case a similar arrangement could be provided at the other end also.

We claim:

1. A helical gear pump comprising a stator having a female helical gear formation thereon having n starts; a rotor rotatable within said female helical gear formation, said rotor having a male helical gear formation thereon of n±1 starts and having two ends; a drive motor; a flexible drive shaft connecting said rotor to said drive motor, said flexible drive shaft, comprising an elongate metal shaft having first and second ends; an enlarged integral head formed on at least said first end, said enlarged head having a free end face; means defining at least one hole passing axially through said enlarged head; fixing means defining holding means passing axially through said at least one hole and engaging one end of said rotor, effective to firmly hold said free end face of the enlarged head against one of the rotor ends in abutting, driving engagement; connecting means connecting the other end of said flexible drive shaft to said motor and a plastics material coating extending along substantially the full length of the shaft between said holding means and said connecting means.

2. A helical gear pump as claimed in claim 1, wherein said enlarged head is a forged head, e.g. an upset forged head.

3. A flexible drive shaft for a helical gear pump, said drive shaft comprising an elongate metal shaft having first and second ends; an enlarged integral head formed on at least one of the first and second ends of said shaft; means defining at least one hole passing axially through said enlarged head and adapted to cooperate with fixing means comprising means defining at least one bolt adapted to pass axially through said at least one hole and be screwed into said one end of the rotor effective to firmly hold said enlarged head in abutting, driving engagement with the rotor of said helical gear pump; connecting means effective to connect to other end of the drive shaft to a drive motor and a plastics material coating extending along substantially the full length of said shaft between said fixing means and said connecting means.

4. A helical gear pump as claimed in claim 3, wherein said fixing means further comprises a cap having a plurality of apertures formed therein, each in register with one of said holes, and wherein said bolts are passed through said aperture and said holes to be screwed into said rotor end.

5. A helical gear pump as claimed in claim 4, wherein said cap is annular.

6. A helical gear pump as claimed in claim 5, wherein said cap further comprising a skirt surrounding the outer periphery of said upset forged head.

7. A helical gear pump as claimed in claim 6 and further comprising a sealing ring engageable between the free edge of the skirt and the end of the rotor.

8. A helical gear pump as claimed in claim 4 and further comprising a cover plate mountable on the end face of said cap remote from said forged head, retaining screws holding said cover in place and a seal on the inner periphery of said cover plate sealingly engageable with an end portion of the plastics material coating.

9. A helical gear pump as claimed in claim 8 and further comprising a gasket positioned between said cover plate and said cap.

* * * * *